US006674463B1

(12) United States Patent
Just et al.

(10) Patent No.: US 6,674,463 B1
(45) Date of Patent: Jan. 6, 2004

(54) TECHNIQUE FOR AUTOSTEREOSCOPIC IMAGE, FILM AND TELEVISION ACQUISITION AND DISPLAY BY MULTI-APERTURE MULTIPLEXING

(76) Inventors: Deiter Just, Karlsbaderstr. 17, 64342 Seeheim (DE); Hartmut Runge, Waldfriedhofstr. 16, 81377 München (DE)

( * ) Notice: Subject to any disclaimer, the term of this patent is extended or adjusted under 35 U.S.C. 154(b) by 673 days.

(21) Appl. No.: 09/631,902

(22) Filed: Aug. 4, 2000

Related U.S. Application Data

(60) Provisional application No. 60/147,712, filed on Aug. 6, 1999.

(51) Int. Cl.$^7$ .......................... H04N 13/00; H04N 15/00
(52) U.S. Cl. ............................. 348/43; 348/48; 348/51
(58) Field of Search ..................... 348/43, 42, 47, 348/48, 51; 359/630, 858

(56) References Cited

U.S. PATENT DOCUMENTS 5,572,375 A * 11/1996 Crabtree, IV ............... 359/858
5,712,732 A * 1/1998 Street ......................... 359/630
6,055,012 A * 4/2000 Haskell et al. ............... 348/48

* cited by examiner

Primary Examiner—Howard Britton
Assistant Examiner—Allen Wong
(74) Attorney, Agent, or Firm—Wood, Herron & Evans, LLP

(57) ABSTRACT

The method involves using multiple aperture multiplexing, with display of image composite in fast sequences such that viewer does not detect changes. The method involves using a screen and an optical closure device in the beam path that can be blocked or made transparent for the segment. The observer is positioned within a defined distance and angular range with respect to the associated device. Perspective views are acquired in real time or non-real time using one or more or one moving image acquisition devices. This provides digital data sets that are converted into suitable image composites and displayed on a screen by a multiplex method. A controller opens one or more closure device apertures to display the image composite, in a sequence so fast that the observer does not detect the changes.

14 Claims, 11 Drawing Sheets

Figure 1:
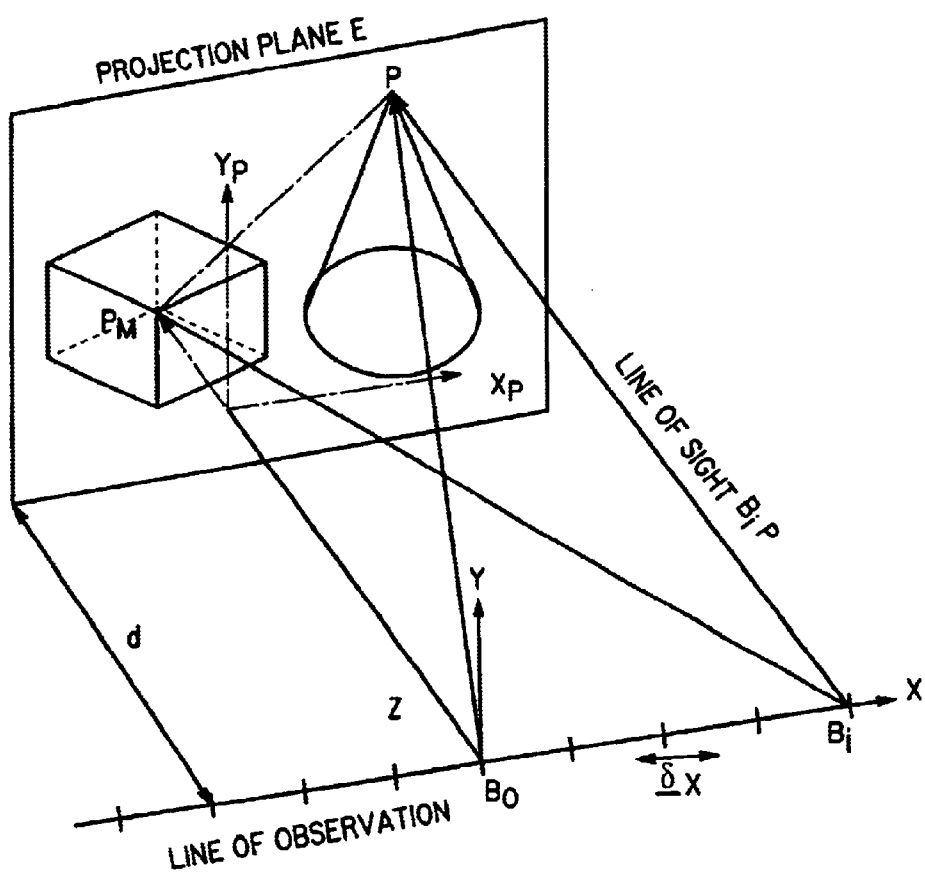

TECHNIQUE FOR AUTOSTEREOSCOPIC IMAGE, FILM AND TELEVISION ACQUISITION AND DISPLAY BY MULTI-APERTURE MULTIPLEXING

This application claims the benefit of provisional application 60/147,712 filed Aug. 6, 1999.

The invention described here is an autostereoscopic technique that allows to acquire and display still, film and television images in such a way that they appear as three dimensional for an observer. The observer(s) perceive the reproduced objects and scenes exactly if he would view these objects in reality. The corresponding still, film and television images may be generated by acquiring of natural scenes using a camera or they may be entirely computer-generated. In addition to a special optical device, some image processing is required in order to obtain suitable images for the 3-D display. This technique is suitable for reproduction of still images as well as for animated scenes and it guarantees a perfect gray and color fidelity. Finally, there are no principle restrictions for the size of the display.

The technique described here makes it possible to acquire and display images autostereoscopically and it is characterized by the following features:

1. Within each position of an defined viewing zone an observer perceives the displayed objects stereoscopically. Since stereoscopy is one of the strongest visual factors of perception, an observer has the impression of perceiving an object that is actually in front of his eyes.
2. When the position of an observer changes, there is a corresponding change in the perceived object perspective while the stereoscopic impression is maintained. Therefore, it is possible to "look around" an object and to perceive object details that were hidden from a previous position. This property is known to us from observing holograms, however up to now it has not been possible to implement it electronically.

People are used to this type of "autostereoscopic" viewing from the natural perception since, in general, the head or eye pupils are always in slight motion, thereby producing corresponding changes in the position of observation (i.e. the perspective). Pure stereoscopic image displays where always the same two perspectives are seen independently of the position of the observer (such as with the aid of polarization or shutter glasses) are perceived as artificial after prolonged viewing, which can lead to a feeling of nausea with many observers.

There is no lack of suggestions for autosteroscopic techniques, although we cannot acknowledge each and every one of them here. A systematic presentation of techniques for 3-D imaging is found in Reference 1 (Takanori Okoshi, Three-Dimensional Imaging Techniques, Academic Press, 1976). References 2/3/4/5/6 refer to patents and publications for autosteroscopic techniques that characterize, to our best knowledge, the present state of the technology. However, in one way or another, all of these techniques have some disadvantages that prevents their practical use in most applications.

One of the first to propose time-multiplexing of perspectives was Colander (Reference 2:Robert B. Collander, 3-D Television, Movies and Computer Graphics without Glasses, IEEE Trans, Consumer Electronics, volume CE-32 (1), February 1986). His system works in the projection mode and uses a special projection screen with an integrated Fresnel lens. One or several projectors are mounted below the screen and rotate in relation to it. Its mechanical design and the special characteristics of its projection screen restrict the potential use of his system.

In Reference 3 (Jesse B. Eichenlaub, Three Dimensional Imaging System, U.S. Pat. 4,367,486, January 1983) and Reference 4 (Jesse B. Eichenlaub, Autosteroscopic Display with Illuminating lines and a Light Valve, European Patent EP0316465A1, May 1989), Eichenlaub describes a technique where perspectives are multiplexed by means of a special arrangement of light sources and a light modulator in front of it. The special feature of this system is its compact design. However, the light modulators available today do not have the required bandwidth for the reproduction of a larger number of perspectives.

In Reference 5 (G. B. Kirby Meacham, Autostereoscopic Displays—Past and Future, SPIE Volume 624, Advances in Display Technology VI, 1986) Meacham presented a follow-up development of Collender's technique that also allows compact designs. The perspective information has to be separated by dark areas, which effectively limits the image resolution and also makes the design more complicated.

In Reference 6 (Adrian Robert Travis, Colour Autostereoscopic Display, International Publication Number WO 95/14353, May 1995), Travis describes a method that is very similar to that of Eichenlaub. However, the design is changed in such a way that it avoids the use of the spatial light modulator. However, this is only achieved by a complicated system of optical components.

Another technique that comes very close to the requirements of a perfect autostereoscopic display is described in Reference 7 (D. Just and H. Runge, Patent DE 4123895 A1. 1991). It is based upon using an optical aperture (in practical applications a stripe-like aperture segment is generally used) that moves in an appropriate distance in front of a monitor. The monitor is modified so that it works at a higher image refresh rate than it is necessary for a normal image and television display. The aperture motion may be a implemented by a genuine mechanical movement or by a pseudo-movement of an electro-optically controlled aperture. A non-mechanical aperture motion, i.e, requiring an electro-optical shutter, would be the preferred solution for any practical system implementation. There is a number of suitable shutter technologies available, the most suitable shutters are ferro-electric liquid crystals with regard to their switching periods and available sizes. Other liquid crystals such as the double-Pi cell could also be used if the image refresh rates are not too high. This is made possible by using the technique of the invention described here. Furthermore, electro-optical crystals such as KTP are suitable candidates to be used as shutters. These crystals can be grown today with side lengths of 0.50 m in very short time.

Regardless of the practical realization of the shutter, perspective images that were acquired from the geometric centers of the aperture positions, e.g. by means of a camera, are shown on the monitor synchronously with the movement of the aperture. If the aperture moves sufficiently fast over the screen, the movement is not longer resolved by an observer and the perspective images merge into a three-dimensional perception. In the following we will designate this technique as the single-aperture technique, because only a single aperture is opened at any moment. The single-aperture technique is specifically characterized by the following properties:

There are no limitations for the position of an observer as a result of restricted observation zones as one finds with almost all other autostereoscopic techniques. The observer can move completely freely to the side and/or backwards and forwards without losing the autostereoscopic impression. Image quality is only compromised in extreme positions of observation, which for all practical purposes are completely irrelevant. For example, an observer very far away or very close to the shutter or an observer in an extreme lateral position may experience some degradations. The property described already implies that there is no restriction for an unlimited number of observers. Each observer perceives the reproduced 3-D scene from a perspective that is correct for his or her position.

The observer(s) do(Es) not require any visual aids (such as polarization or shutter glasses) or any other aids that are often felt as restrictive (such as head-tracking devices). Rather, they are completely free and unobstructed.

The technique only requires a few components: a "normal" monitor with a modified higher image refresh rate than is normally used and a moveable aperture that is in a suitable distance from the monitor. The aperture may be implemented mechanical or non-mechanical. In addition, there is of course the electronic control mechanism that is indispensable for its correct functioning. No further optical devices are needed and no precise alignments are required between the monitor and the aperture.

Although this technique is impressive because of its simplicity, there are some disadvantages which are too restrictive for most commercial applications:

1) On the one hand, the design described in Reference 7 requires a large volume. At best, when the optical path is suitably folded, one needs approximately the dimensions of a large-scale CRT.
2) There is a dependence between the width of the aperture and the number of the perspectives that can be reproduced. This makes the technique not suitable for a low number of perspectives, in particular it can not be adapted to the stereoscopic case where only two perspectives are used.
3) The technique has rather high light losses so that it is necessary to have a bright screen.
4) The required image refresh rate is very high, and therefore it can only be realized with few available display techniques.
5) The use of perspective images as they are normally employed with other autostereoscopic techniques (refer to Reference 2 for this), results in geometric distortions that can be disturbing when observing displayed scenes.

Especially points 3) and 4) make it difficult to practically implement the system. The image refresh rate required results can be calculated by the multiplication of the standard image refresh rate for a flicker-free image (typically 50 to 70 Hz) and the number of the required perspective views (typically one perspective per degree of viewing angle). A large viewing angle of typically 90 to 180 degrees requires therefore refresh rates of several thousand Hertz. Besides this, the image brightness is reduced in proportion to the number of perspectives. As impressive as a wide viewing angle range of such a system is, it is under most practical circumstances irrelevant because one usually utilizes a relatively limited latitude of movement in front of a workstation computer or a video screen, e.g. slight head and body movements or slight changes in the distance to the screen. Furthermore, by computer-aided manipulation it is possible to rotate a 3-D object and to observe it from all sides. The invention described here in all of its various designs takes advantage of this insight and avoids the disadvantages of the technique described in Reference 7. Apart from the improvements in the image refresh rates and picture brightness, it is possible to achieve significantly more compact designs all the way to flat screen monitors. Some of the designs are suitable for both a very small numbers of perspectives (all the way down to the stereoscopic case) and a large numbers of perspectives so that it can be adapted to various applications. It is further possible to achieve distortion-free displays by proper generation and/or processing of the perspective images. This geometrical processing of perspective images may also be applied with advantage to the technique described on Reference 7.

In the following, we would like to start off by explaining the drawings of this patent application, then we explain the technique of the invention, including some design examples, and finally the patent claims are presented.

FIG. 1 shows the perspective view of a three-dimensional scene (consisting of a cube and a cone) as well as a line of observation in front of the scene with marked positions $B_O$ and $B_i$. Furthermore, a virtual plane of projection E is shown that defines, together with an observation point $B_i$, a perspective. A perspective is the set of points in E that is formed by intersection of all lines of sight $B_iP$ with E, i.e. the intersection of plane E with all lines connecting a point P in the scene to the position of observation $B_i$. A left-handed coordinate system x, y, z is centred at the point $B_O$ of observation and the positive z-axis points towards the center point of the scene $P_m$ (here we arbitrarily assume it to be center of the cube). The plane of projection E is co-planar to the x, y plane and uses co-planar coordinates $x_p$, $y_p$ for the pixel of a perspective.

Figure 2:
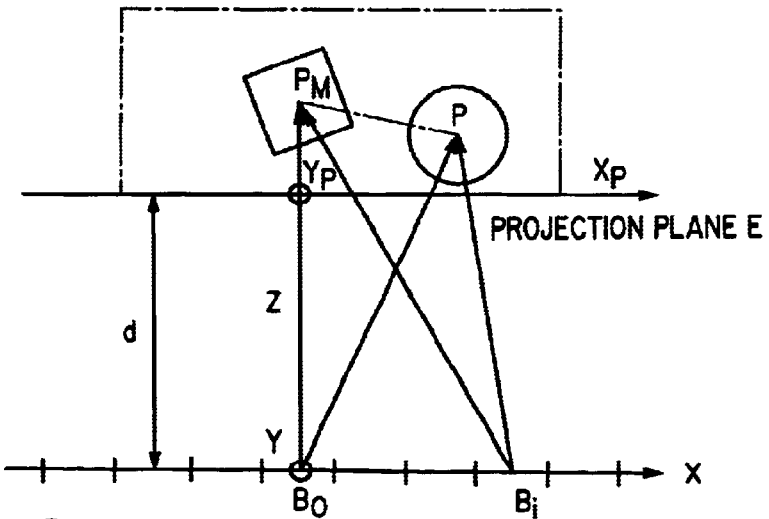

FIG. 2 shows a top view of the same geometric configuration as in FIG. 1.

Figure 3:
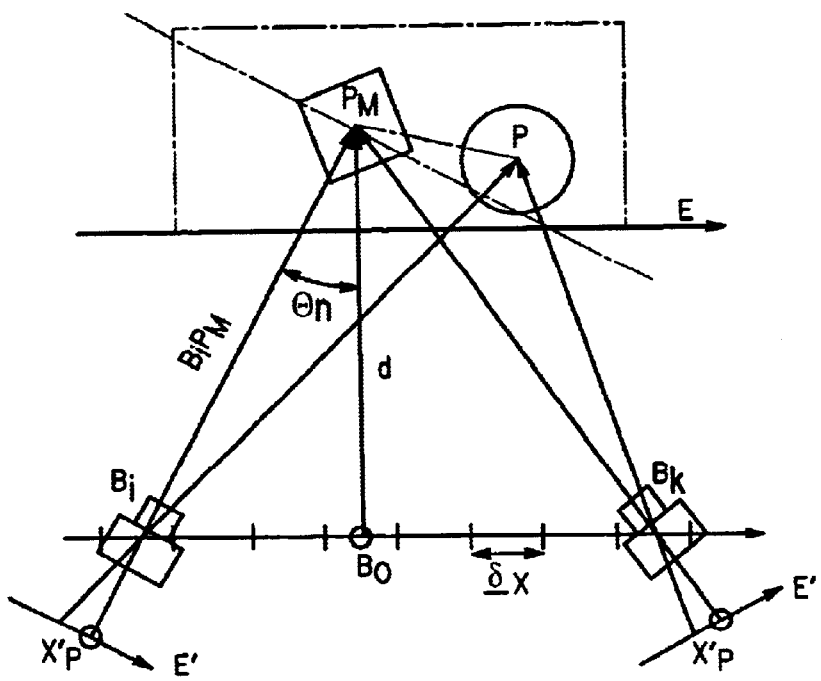

FIG. 3 also shows a top view of the geometric configuration as in FIG. 1. However, plane E is no longer used as the plane of projection, rather than a plane E' that is perpendicular to the line of sight $B_iP_m$ (i.e. the line from an observation point to the centre of the scene). The plane coordinates are $x'_p$, $y'_p$. This produces perspective images as they would be obtained from a regular camera (shown here schematically) at the position of observation (except for the correct scaling).

Figure 4:
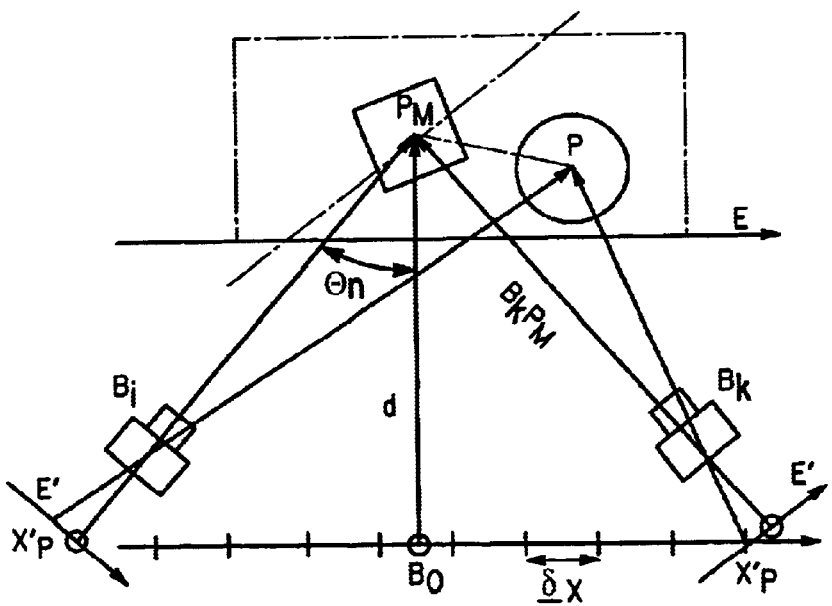

FIG. 4 is identical to FIG. 3, however the points of observation are arranged along a circle around the center of the scene (for sake of clarity we have also drawn the original observation line). Plane E' perpendicular to the line of sight $B_iP_m$ (i.e. from an observation point to the center of the scene) is used as the plane of projection (with coordinates $x'_p$, $y'_p$), similar as shown in FIG. 3. The camera interpretation of the perspectives obtained by intersection of the line-of-sights $B_iP$ with plane E' is the same as in FIG. 3.

Figure 5:
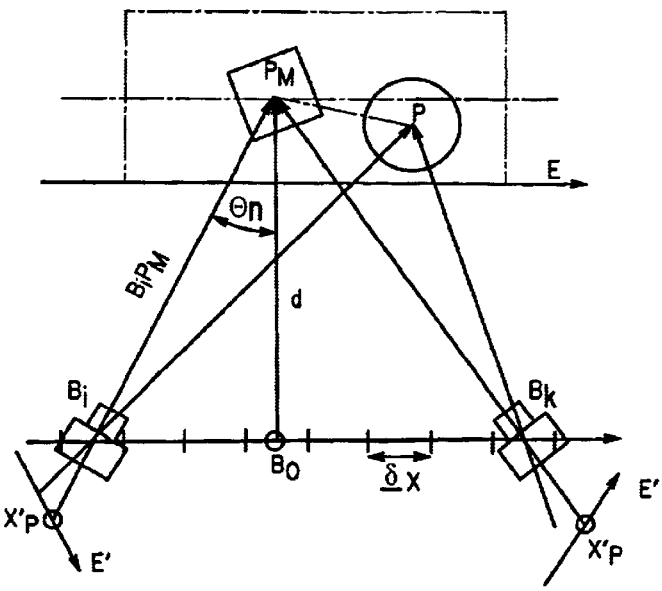

FIG. 5 is identical to FIG. 3, however the camera is used in a configuration known as Scheimflug condition. Here, the camera's film plane is inclined to the optical camera axis at the same angle as this axis is inclined to the plane E. In this condition is the inclined film plane of the camera the plane of projection E'.

Figure 6:
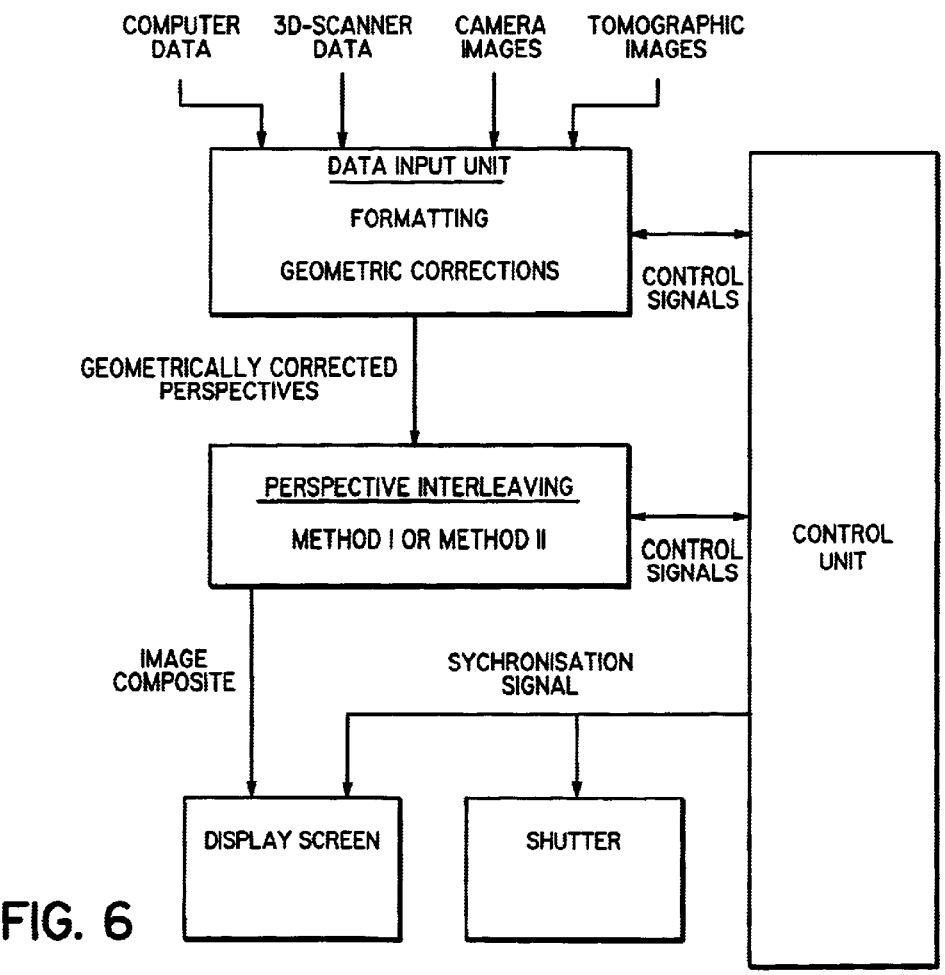

FIG. 6 shows a block diagram of the technique of the invention: a data input stage reads in and formats the various data records that can be used by the three-dimensional display. Another function of this processing unit is the optional geometric correction of the data. The data input stage transfers the image data processed in this fashion to the next module. This module decomposes these images and builds up new mosaic-perspectives according to the technique described in the text. The interlaced perspectives, designated here as a composite image, are send directly to the screen. Both of these modules are controlled by a control unit and give status information back to it. The control unit derives a synchronization signal from this that it sends it to the screen and shutter. This signal synchronizes the proper opening of the shutter apertures with the display of the correspondent composite images.

Figures 7A, 7B:
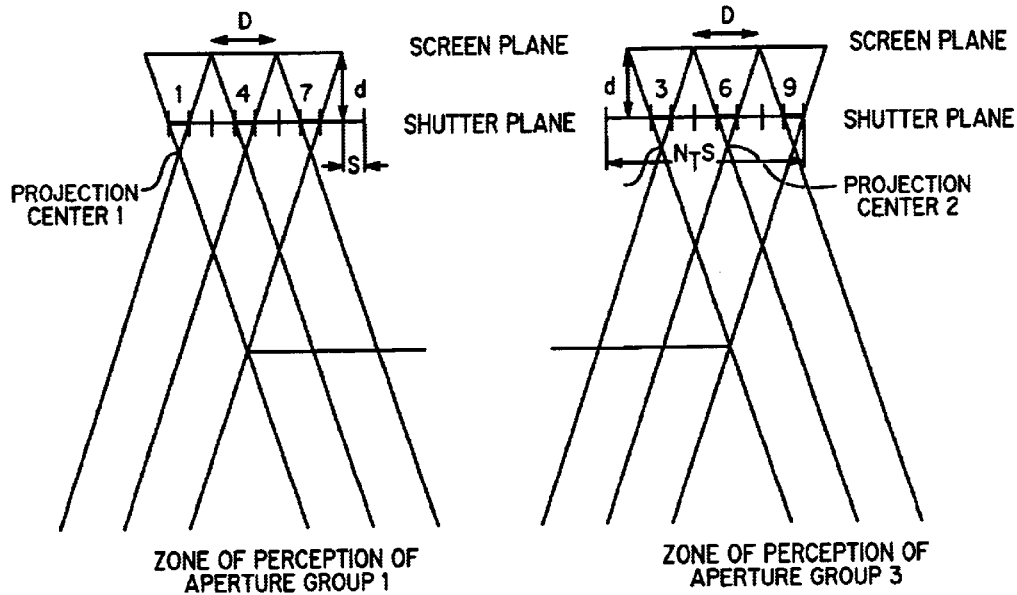
Figure 7C:
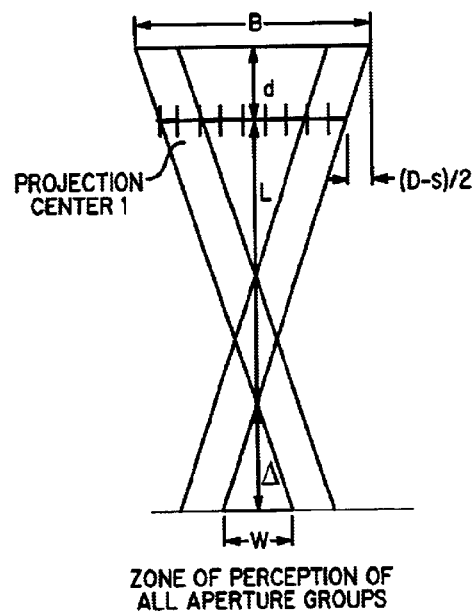

FIGS. 7a, b and c show a representation of technique 1 for three apertures opened simultaneously (1, 4 and 7 in FIG. 7a or 3, 6 and 9 in 7b). The perspective sub-images of width D are determined by the intersection of the rays that originate from the projection centers behind the apertures with the screen plane. The perspective sub-images of width D that make up a composite image are adjacent to each other. This produces a zone of distortion-free perception for each group of open apertures that is shown here in bold print. FIGS. 7a and 7b show the zones of perception for two different moments during the multiplex cycle. In the example shown, three cycles are required to open all of the apertures once. FIG. 7a corresponds to the first time cycles (apertures 1, 4 and 7 open) while FIG. 7b shows the third time cycle (apertures 3, 6 and 9 open), FIG. 7c shows the perception zone that results from the overlap of all zones of individual aperture groups.

Figure 8:
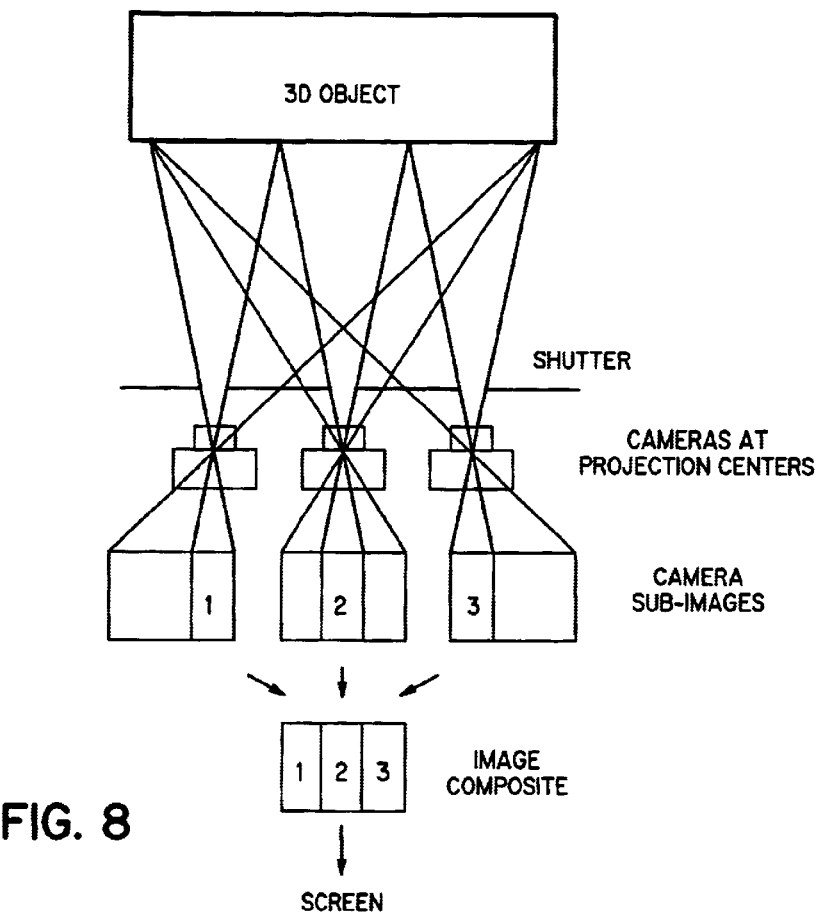

FIG. 8 shows the "direct" generation of a composite image as it can be created from a number of corresponding camera acquisitions. The cameras are positioned at the centers of projection for the individual perspective sub-images close to the aperture plane. The apertures in front of the cameras limit the viewing angle at the three-dimensional scene. Therefore, it is only possible to perceive a partial view of it. The acquired partial views, called perspective sub-images, are then assembled into a composite according to their relative arrangement on the screen (we may have to take mirroring by the camera into account) and then send to the screen.

Figure 9:
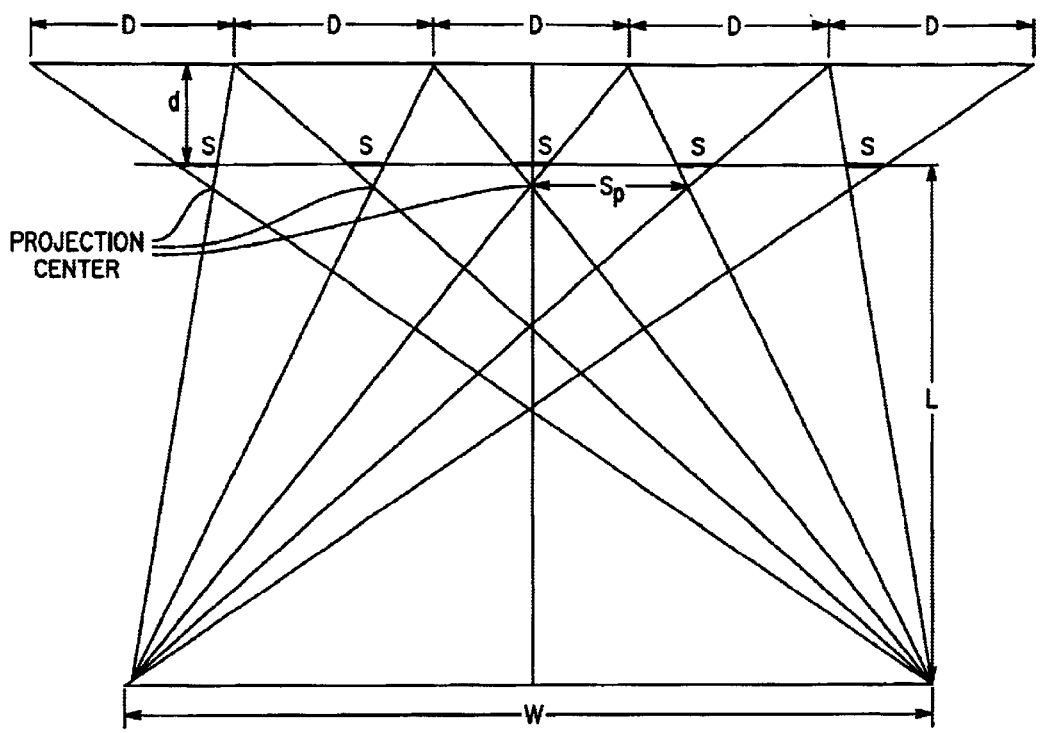

FIG. 9 shows a representation of technique 2, where the sub-images of width D are behind the aperture plane. The apertures which are opened at a given moment (shown in bold print) have the distance $S_p$ from each other and the width S. During one cycle all aperture groups are switched to open once. Hence, the entire shutter aperture has been opened once within one cycle. The corresponding sub-images of width D are displayed on the screen in synchronization with the group of apertures being opened. By design, the zones of perception of all sub-images overlap on an observation line of width W at a distance L in front of the aperture plane.

Figure 10:
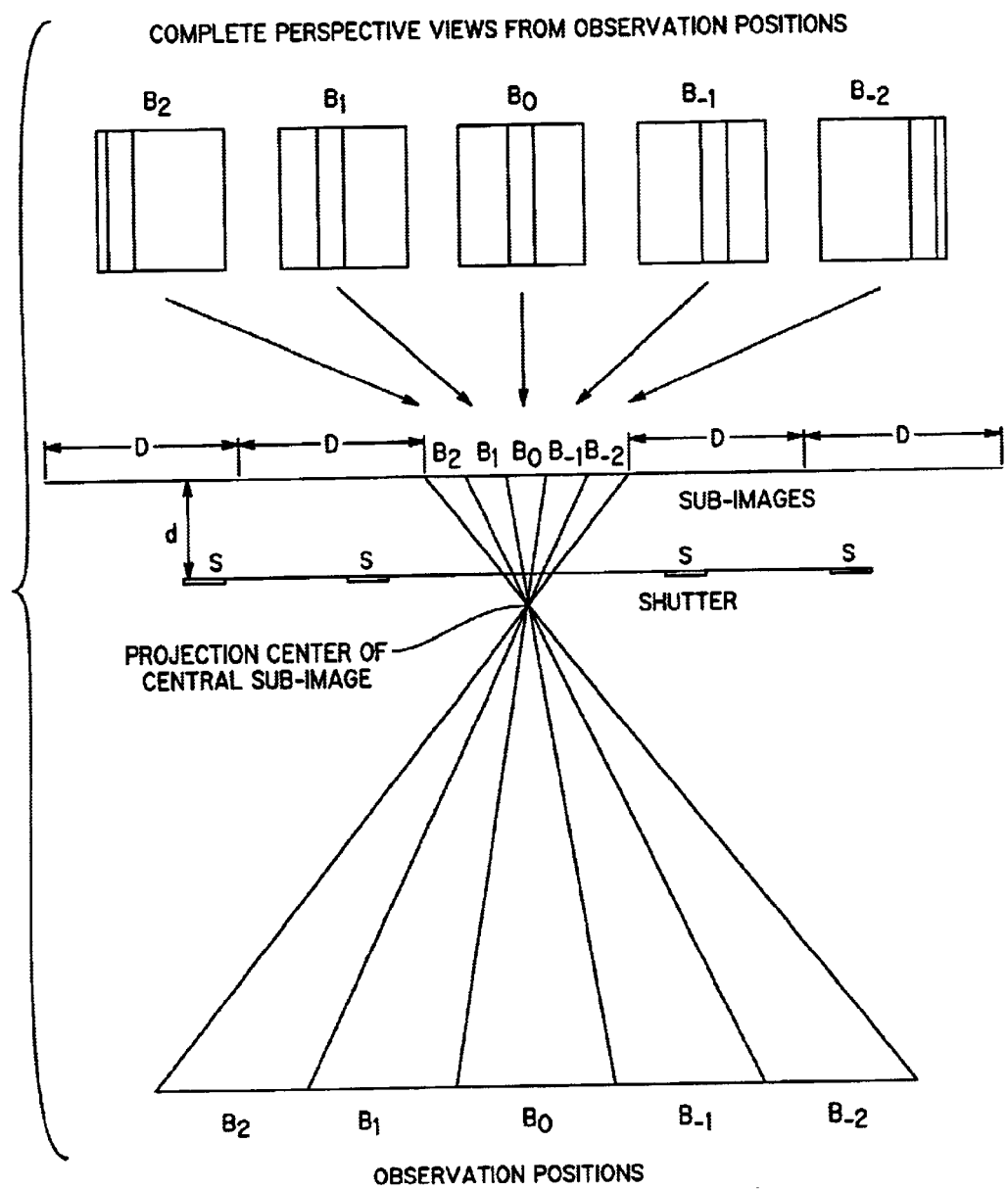

FIG. 10 illustrates how the composite images can be generated "indirectly" using the example of the central sub-image. All of the other sub-images have to be generated and added in the same fashion for generation of a complete composite image. Instead of positioning a camera in the center of projection, it is also possible to obtain the sub-image from an observation line of width W further away from the aperture plane. However, several camera acquisitions have to be made then. In this process, the observation line is divided up into a number of zones. In the example shown, there are five of them that are projected through the aperture into corresponding segments on the screen. If we have a set of complete perspective taken from the positions $B_i$, we can compose the sub-image by cut-and paste of these segments from the complete perspectives.

Figure 11:
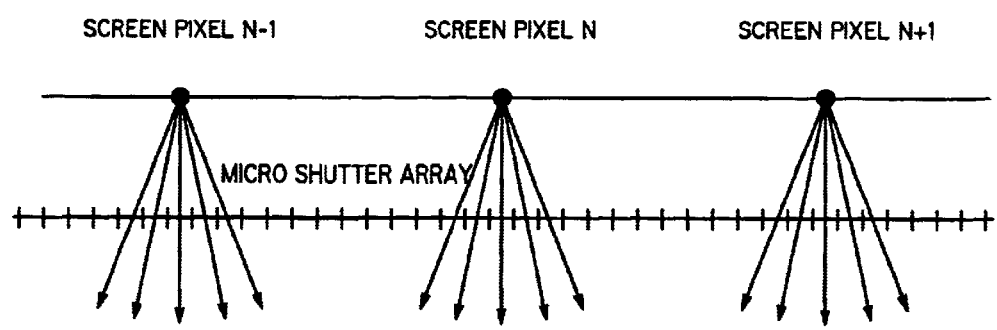

FIG. 11 shows an extreme example of design according to technique 2 where an arrangement of micro-apertures is allocated to each screen pixel and aperture segments open and close in synchronization with the variation of pixel brightness according to the perspective view.

Figure 12:
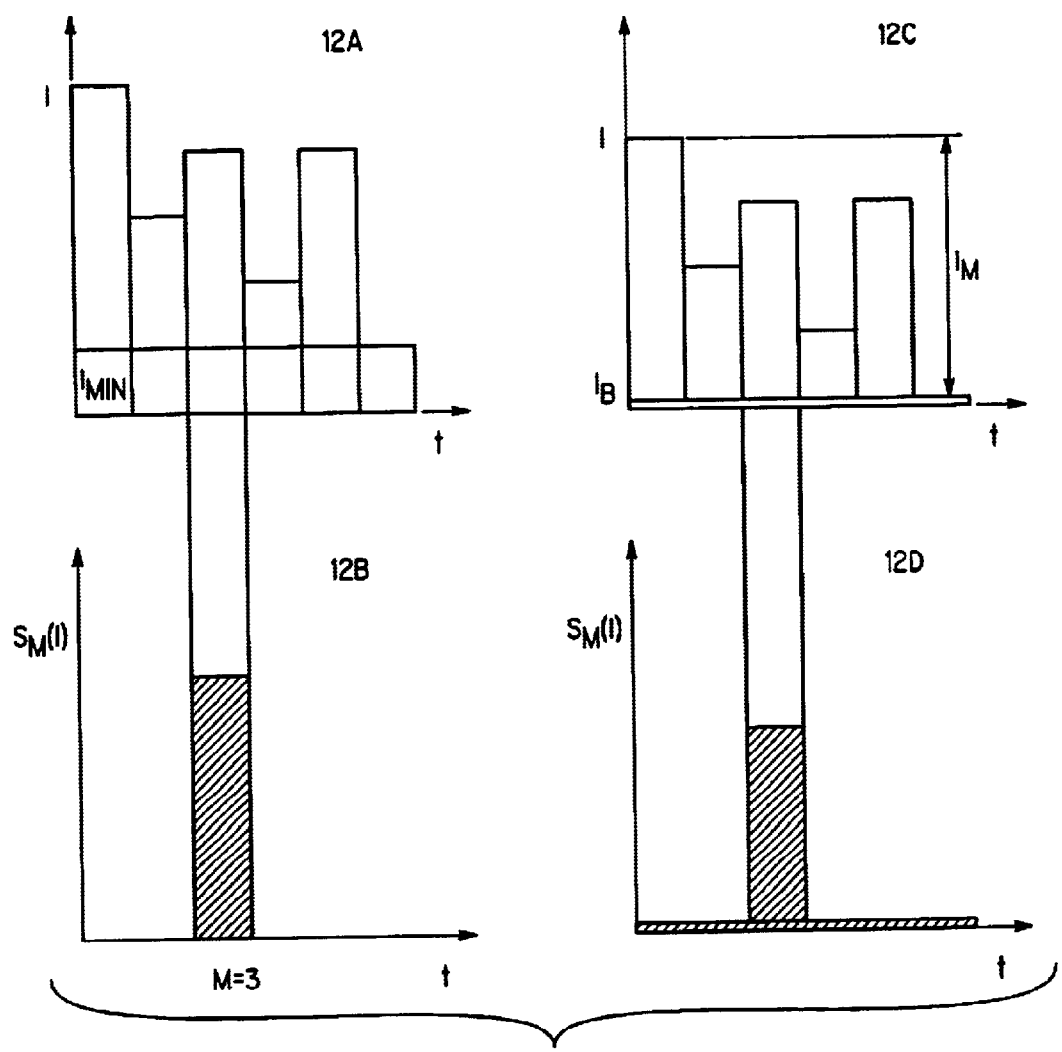

FIG. 12a shows of the change in intensity of a screen pixel over 6 clock cycles of a multiplex cycle (corresponding to 6 apertures) as well as the integrated brightness of the third aperture over the full multiplex cycle (the cross-hatched area in FIG. 12b). The minimum value of intensity that appears in FIG. 12a is $I_{min}$. FIG. 12b shows the aperture brightness for the third aperture according to the single-aperture technique where the aperture is only opened for one clock cycle. FIG. 12c shows the split of the intensity into a bias component $I_b$ and a modulation component $I_n$, $I_b$ is one-sixth of the minimum value $I_{min}$ and is constantly let through all apertures so that the integrated aperture brightness in FIG. 12d (the cross-hatched area) corresponds exactly to that of FIG. 12b although the intensity range in FIG. 12c is reduced to the original one.

Figure 13:
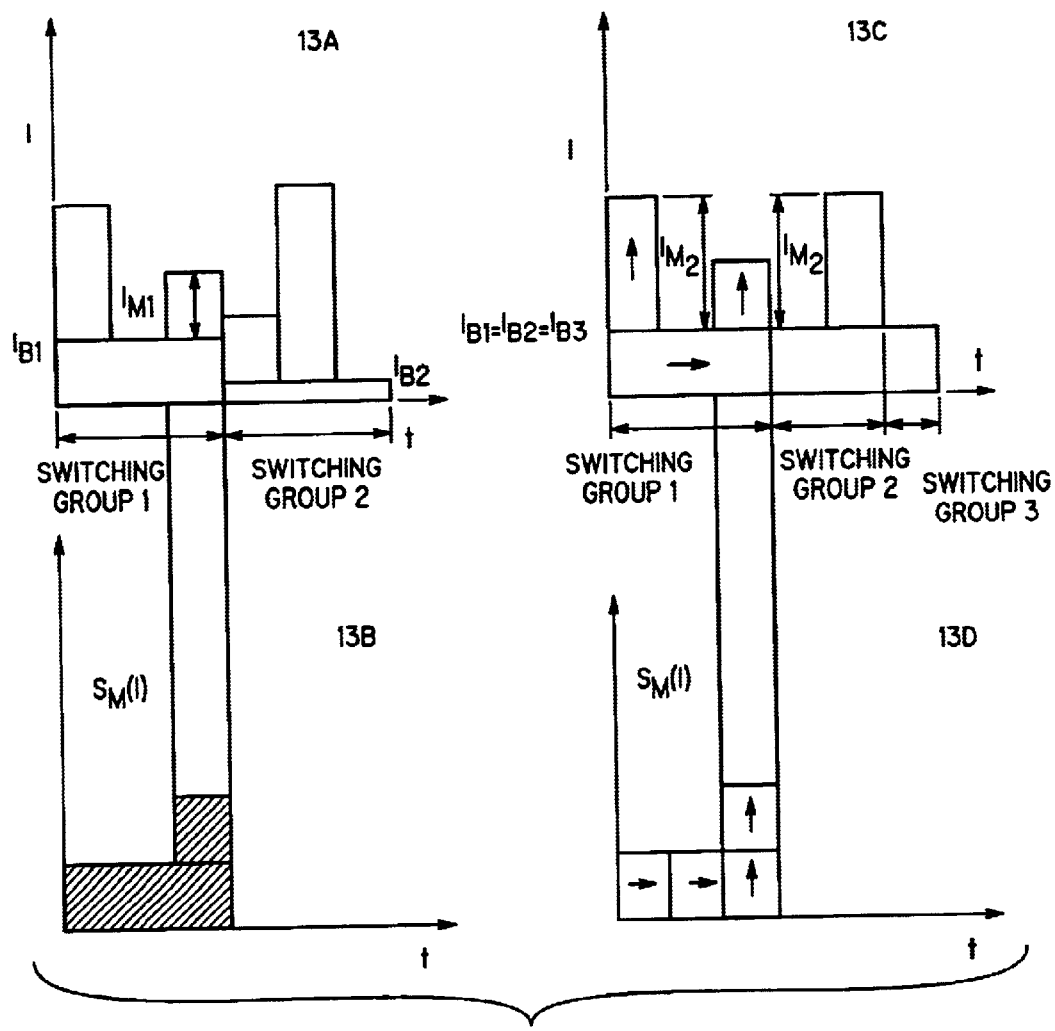

FIG. 13a shows a decomposition into a bias and modulation component in a similar fashion to FIG. 12c. However, the decomposition is specific for each of two switching groups. FIG. 13b shows that the integrated aperture brightness is again identical with that of FIG. 12b. FIG. 13c shows a decomposition for three switching groups. The arrows shown within the intensity bars indicate the light polarization that is used to encode the corresponding light components. In the same fashion, FIG. 13d shows the aperture brightness as a function of polarization over one multiplex cycle.

Figure 14:
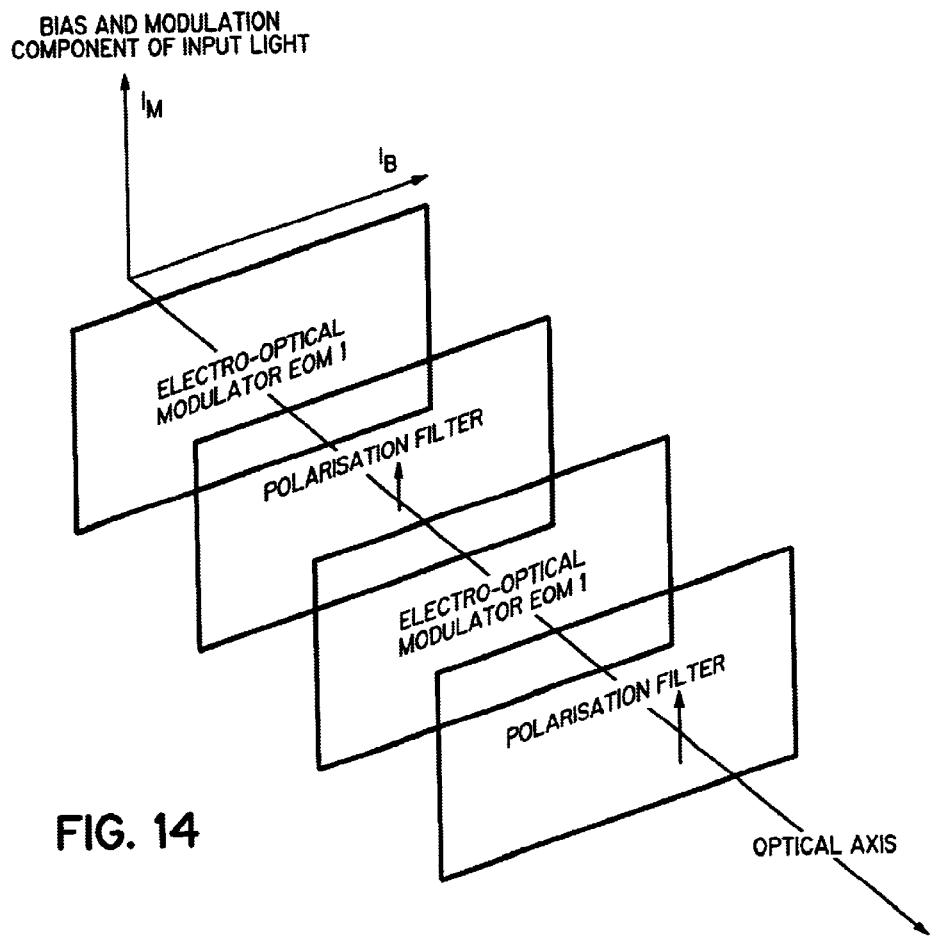

FIG. 14 shows the polarization of the bias and modulation component (the bias component in horizontal polarization and the modulation component in vertical polarization). Both light components go through a device of two electro-optical modulators behind each of which a polarizer is placed (transparent to vertical polarization and opaque to horizontal polarization). If we apply a voltage to the first electro-optical modulator, the initial polarization is rotated by 90 degrees. That is, the polarization of the bias component is transformed into vertical polarization while the modulation component transforms into horizontal polarization. Since the first polarizer only allows light of vertical polarization to pass, it is possible to switch from the modulation component to the bias component by applying a voltage on the first modulator. If we apply a voltage to the second electro-optical modulator, the light entering always in vertical polarization, is also rotated by 90 degrees. In this case, no light passes through the second vertical polarizer and the element is opaque to all light independent of polarization.

Figure 15A:
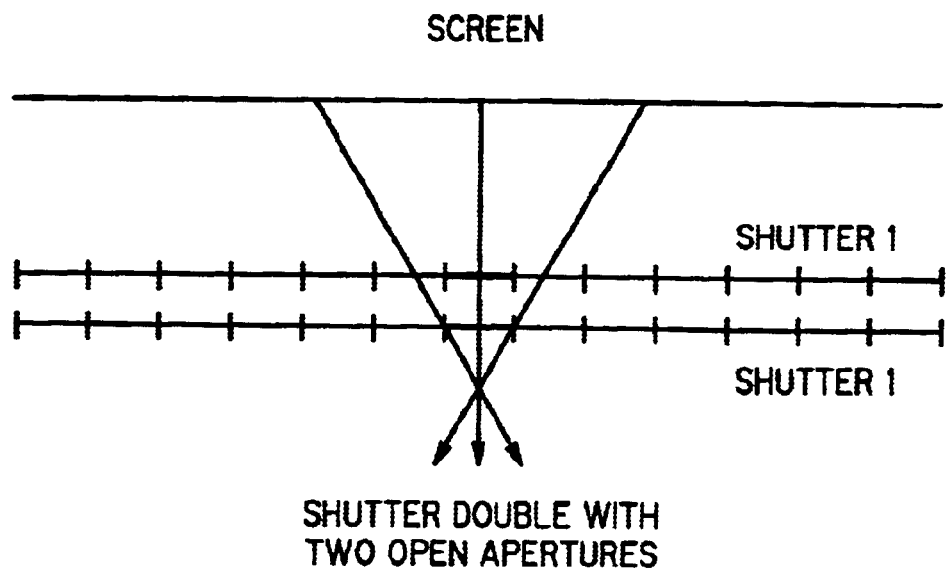
Figure 15B:
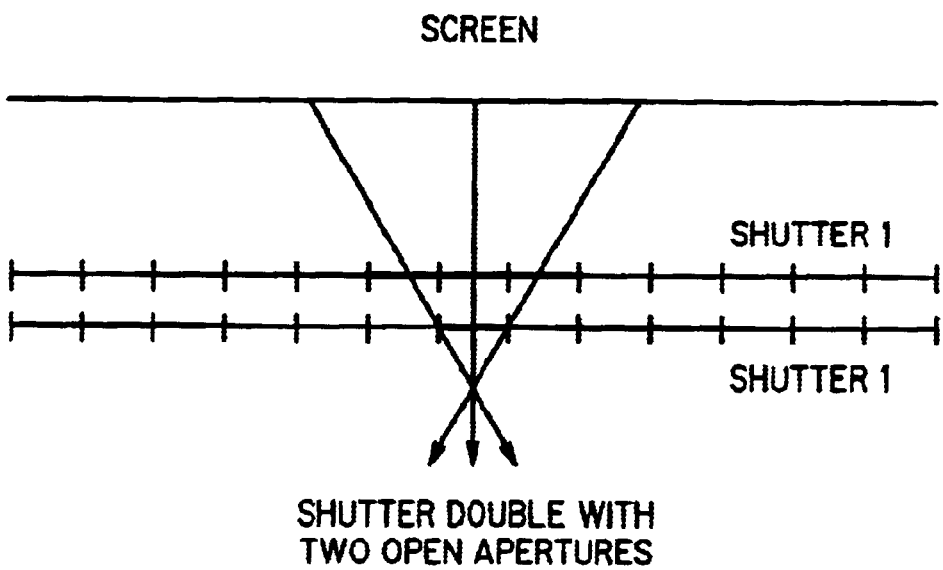

FIG. 15 shows how the light is blocked off by neighboring segments of two open apertures that are opposing each other in a short distance (shown in bold print). Visually the light blocking appears like viewing a scene through a lattice fence (FIG. 15a). Switching the neighboring aperture elements together with the center aperture of one of the two shutters to transparent suppresses this effect without any significant reduction in the overall contrast (FIG. 15b).

Figure 16:
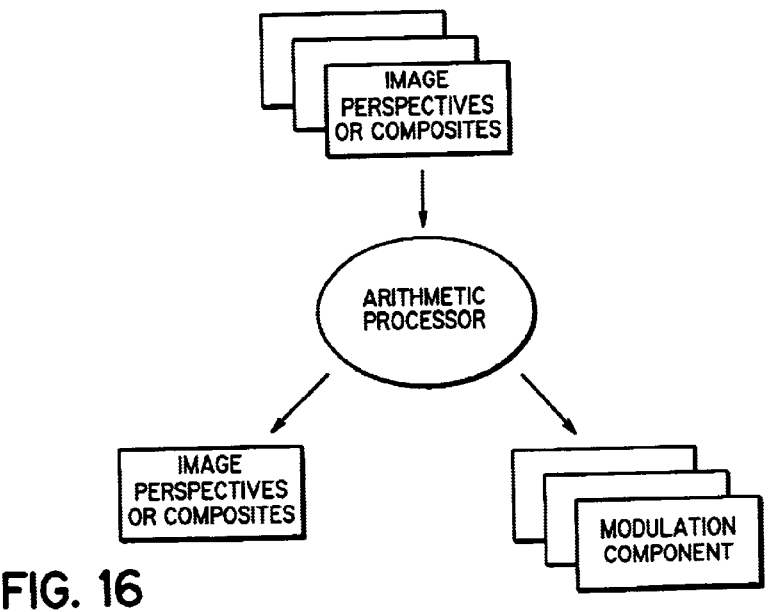

FIG. 16 shows the processing module for exploiting brightness correlations between perspectives. The perspective images are stored in an image memory. An arithmetical processor determines the optimal decomposition into switching groups for every pixel in accordance with the technique of the invention. This generates the a bias and the modulation components. Please note, that the bias component, by definition, is common to all perspectives of a switching group.

We would first like to describe the conditions for the correct geometrical acquisition of image perspectives that is inherently linked to the distortion-free three-dimensional display. It also explains the principle of the autosteroscopic display in general. If we observe a three-dimensional scene, the perceived perspectives of the scene depend on the position of the observer. We consider here only observe changes with horizontal parallax, i.e. only positions along a horizontal line of observation are considered. It is straightforward to generalize the horizontal parallax case to arbitrary observation positions, although it is hardly relevant in practice since they eyes of a human observer are arranged horizontally.

Furthermore, there are practical limitations in the size of the acquisition and display system. For instance, a monitor only has a finite size. This can be best described by assuming that the three-dimensional scene is being observed through a window FIG. 1a shows a perspective view of this situation and FIG. 1b shows the same situation from a top view. The center point of the scene $P_M$ is assumed to lie in the center of the cube. In front of the window is a horizontal line of observation indicated with marked positions $B_i$ (−N<i<N) This observation line runs parallel to the horizontal edges of the window. We define a coordinate system in point $B_o$ with the z-axis in the direction of the connecting line $B_o P_m$ and the x-axis along the horizontal line of observation. The y-axis supplements the coordinate system (which is left handed) The intersection of a line that connects a point of observation $B_i$ with any point P in the scene with coordinates (x, y, z) and the window plane defines a perspective point with coordinates ($x_p$, $y_p$) in this window plane. For a given fixed position of observation $B_i$ the corresponding perspective is defined by the set of all intersection points ($x_p$, $y_p$) that run from $B_i$ to all points P in the scene. Points in the scene that are covered by other objects are not visible. However, these points may be visible from another position. It is possible to derive the relation between the object coordinates (x, y, z) and perspective coordinates ($x_p$, $y_p$) from the geometry in FIGS. 1a and b.

$$x_p = \frac{x \cdot d + (z-d) \cdot n \cdot \delta x}{z} \qquad \text{equation 1}$$

$$y_p = \frac{y \cdot d}{z}$$

In order to guarantee a distortion-free display of a three-dimensional scene it is necessary to determine the perspective images of a scene in accordance with equation 1. Perspective images used with other autosteroscopic techniques fulfill this requirement only approximately. Two methods shall be mentioned which are often used for generation of perspectives. These are shown from a top view in FIGS. 3 and 4. In FIG. 3, the perspective images are created in exactly the same fashion as in FIG. 2, i.e. from a point that is on the horizontal line of observation. However, the difference is the fact that the plane of projection E' no longer coincides with the window plane E, rather it is perpendicular to the line of sight $B_i P_m$. The perspectives that are produced by this projection are equivalent to a acquisition of a perspective by means of a camera placed at location $B_i$ (in the geometrical optics approximation). Of course, due to the available focal lengths it is not a 1:1 imaging. However this results only in a global scaling factor. One can derive the relation between the planar coordinates of projection the spatial coordinates (x, y, z) of the scene from FIG. 3 (notation used is as in FIG. 3):

$$x_p = \frac{(x - n\delta x) \cdot \cos\theta_n + z \cdot \sin\theta_n}{z \cdot \cos\theta_n - (x - n\delta x) \cdot \sin\theta_n} \cdot d = \frac{(x - n\delta x) \cdot d + z \cdot n\delta x}{z - (x - n\delta x) \cdot \tan\theta_n} \qquad \text{equation 2}$$

$$y_p = \frac{y \cdot d}{z \cdot \cos\theta_n - (x - n\delta x) \cdot \sin\theta_n}$$

-continued $$\tan\theta_n = \frac{n\delta x}{d}$$

The perspective images in FIG. 4 are acquired in a similar fashion as in FIG. 3, however the point of observation $B_i$ is now moving on a circular path around the centre point $P_m$ of the scene. The plane of projection E' is also perpendicular to the line of sight $B_i P_m$ and therefore not coincident with the widow plane E. Once again, one can derive the relation between the planar projection coordinates and the scene coordinates from FIG. 4 (notation as used in FIG. 4):

$$x_p = \frac{x \cdot \cos\theta_n + (z-d) \cdot \sin\theta_n}{(z-d) \cdot \cos\theta_n + d - x \cdot \sin\theta_n} \cdot d \qquad \text{equation 3}$$

$$y_p = \frac{y \cdot d}{(z-d) \cdot \cos\theta_n + d - x \cdot \sin\theta_n}$$

If we compare equations 1, 2 and 3, one can see that the coordinate transformations for small angles are approximately the same and even identical to one another for the center perspectives $B_o$. However, for large viewing angles, the deviations are not always negligible so that distortions appear in the display when the perspective coordinates ($x_p$, $y_p$) are calculated according to equations 2 and 3 instead of according to equation 1.

In order to assure that perspectives of a real scene obtained by a camera are consistent with equation 1, the camera should be used in the so called 'Scheimflug' condition. This condition requires that the optical camera axis is inclined to the film plane of the camera E' by the same angle as it is to the window plane E. FIG. 5 shows this case for the acquisition geometry of FIG. 3. It can be shown that the projection coordinates are related to the scene coordinates by:

$$x_p = \frac{(x - n\delta x) \cdot d + z \cdot n\delta x}{z / \cos\theta_n} \qquad \text{equation 4}$$

$$y_p = \frac{y \cdot d}{z \cdot \cos\theta_n - (x - n\delta x) \cdot \sin\theta_n}$$

Therefore the projection coordinate $x_p$ is exactly identical to equation 1 except for a scaling factor. The vertical coordinate $y_p$ can be corrected in the same way by inclining the camera plane in the orthogonal direction.

Another possibility is to use a three-dimensional scanner which determines directly the spatial scene coordinates (x, y, z). They are then transformed into correct perspective image coordinates by insertion into equation 1. The camera imaging methods according to equations 2 and 3 are usually also applied in commercially available computer programs for the generation of perspective views. However, a module that implements the correct transformation according to equation 1 could be easily added. Digital data records obtained from inherent three-dimensional recording techniques, e.g. medical tomography data, are mostly stored in spatial coordinates (these may also refer to abstract or virtual coordinate spaces). Hence they can be treated in a similar way as three-dimensional scanner data.

If there are only 'regular' perspective of a scene available, then they have to be corrected for a distortion-free image display. To achieve this one can proceed as follows:
 a) first of all, corresponding points in the perspectives that relate to the same point in the scene have to be identified. There are already a number of techniques for this that can be found in the literature.

b) it is possible to solve equations 1 and 2 for the scene coordinates once the corresponding points are known.

c) in the final step, the corrected perspectives are calculated from the scene coordinates according to equation 1.

The perspectives can be corrected in real time or off-line.

In the following, we will assume that the perspectives are given in the correct geometric representation. Let us further assume that these perspectives of a three-dimensional scene are stored (in analog or digital fashion) together with the corresponding pixel light intensities (and color information). It is then possible to present an observer the same visual impression as when a real scene, if we achieve that a perspective which corresponds to a given position of observation can only be seen from this position and not from any other one. This requirement can be achieved with stereo holograms which encode the perspectives in a sequence of adjacent hologram stripes. If an observer looks through one single hologram stripe, he sees the encoded perspective view reconstructed in a plane behind the hologram. If he moves along the hologram stripes, he sees exactly the sequence of perspectives as in natural perception. The hologram stripes are so narrow that a point in the scene is always viewed through two different hologram stripes by the two eyes of an observer, which results in the stereo perception. Another technical solution to the problem is the use of a moving aperture: when the aperture is centered around one of the positions of observation, the corresponding perspective view (i.e. the one that is recorded by a camera in this position) is shown on a monitor (which plays the role of the window plane) placed behind the aperture. As the aperture moves to the next position this process is repeated until it starts again from the beginning. Of course, the aperture has to move fast enough that it can not longer be resolved by an observer. In addition, the synchronization of the perspective images on the monitor with the movement of the aperture is essential. This method is the single-aperture technique disclosed in Reference 7.

The invention described here is based upon this idea, although it uses several apertures, which makes it possible to avoid the disadvantages of the single-aperture technique listed above. We would like to describe two technical design that differ somewhat from one another in the exact design details and their display characteristics. Both designs are based upon the simultaneous opening of several apertures within a clock cycle of a multiplex cycle. In the next clock cycle, the aperture group that is currently open is closed and the next aperture group is opened, and so on until the process repeats itself with the opening of the first aperture group. When an aperture group is opened the corresponding perspective information, designated as a composite images, has to be shown on the screen at the same time. In contrast to the single aperture technique, it is composed of sub-images from "regular" perspectives, because the opening of several apertures require to share the screen area among several perspectives. The two designs differ in the geometrical alignment of these sub-images relative to the opened apertures:

a) with multi-aperture method I, the perspective sub-images are centered exactly behind the opened apertures (FIGS. 7a and b). During a clock cycle, several equidistant aperture stripes in the aperture plane (in FIG. 7a these apertures highlighted in bold print with the numbering 1, 4 and 7) are opened simultaneously. FIG. 7a shows the case where the perspective sub-images that belong to the simultaneously opened apertures are adjacent to each other. The available screen area is used most efficiently in this way. However, it would be possible to insert dark separation bars between the sub-images in order to suppress a potential cross-talk between perspectives. Since only a sub-image is shown from each of the original (complete) perspective behind the opened apertures, the zone within which an observer has a distortion-free perception is limited. This zone within which an observer can move relative to an opened aperture segment is determined by the geometrical configuration between the sub-image to the aperture segment. There is a cone-shaped area for each aperture that extends into the observation space originating from the projection center which corresponds to a sub-image (FIGS. 7a and b). If an observer moves outside this zone, perspective sub-images may be perceived through this aperture that do not belong to it, thereby causing a distortion in the three-dimensional viewing. Since this applies to every opened segment the zone of distortion-free three-dimensional viewing is reduced to the overlap of the zones for each individual opened aperture within a group (in FIGS. 7a and b, drawn in bold print). The conditions described for a group of opened apertures also apply to every other aperture group that is opened in the course of the multiplex cycle. FIG. 7b shows the group of apertures 3, 6 and 9 in the opened state (shown in bold print). However, the zone of distortion-free perception is shifted between two aperture groups to the same extent that they are shifted relative to each other. Since an observer has to receive consistent information from all aperture groups within one multiplex cycle, the zone of distortion-free three-dimensional perception is again defined by the overlap of zones for each aperture group. It is sufficient to determine the overlap between the first and the last aperture group as this zone is automatically valid for all groups in-between. FIG. 7c shows the relationships for the example from FIGS. 7a and b. For a practical design it is important to determine the distance L of the zone of perception to the aperture plane as well as the distance from the beginning of the zone of perception to a line of observation with a specified width W. Using the notations shown in FIGS. 7a, b and c, the following relations apply:

$$L = \frac{d \cdot N_T \cdot s}{D-s} \qquad \text{equation 5}$$

$$\Delta = \frac{W \cdot d}{D-s}$$

A typical number of aperture opened simultaneously is three or four, however the value may vary according to the specific design.

b) with multiplex-aperture method II, the perspective sub-images on the screen are also adjacent to each other for best utilization of the screen area. While with method I, the aperture centers acre exactly opposite to the sub-image centers, method II modifies this geometry. The array of aperture segments is aligned to the perspective sub-images in such a way that the valid zones of perception coincides on a specified line of observation W (FIG. 9) for all shutter segments. This geometry implies that the array of opened apertures is again periodic (but with a period $S_p$ that differs from that of the perspective sub-images). One can show that the aperture width s is by design the same for all apertures positions. The line of observation W can be selected to be so large as the overall aperture width of an equivalent single-aperture system. This automatically enables the same wide zone of perception for one or more. The relation between the aperture period $S_p$ within an opened aperture group, the aperture width s, the width D of the perspective sub-images, the width of the line of observation W as well as the distances from the screen to the shutter plane d and from the shutter plane to the line of observation L are crucial for the design. The following relations are derived from the geometry of FIG. 9:

$$S_p = \frac{DL}{L+d} \quad \text{equation 6}$$

$$s = \frac{D \cdot L - W \cdot d}{L+d}$$

The number of the aperture segments opened simultaneously is again a variable design parameter and can be as large as 30 or more for some designs.

The two design principles define also the techniques for the generation of the composite images. One can distinguish between a direct and indirect generation of the composite image. In the direct approach (FIG. 8), each sub-image of a composite image is acquired from a corresponding projection center. For example, one would place a camera in this position, if a natural scene were to be recorded. By suitably limiting the field of view a segment of width D, i.e. the sub-image, would be recorded by the camera. The composite image is assembled from the recording of several sub-images that correspond to the open apertures of a group. When the composite image is indirectly generated (FIG. 10), each sub-image itself is determined from a number of sub-image segments. These sub-image segments correspond to the views that are visible from the positions $B_i$ (i=−2.2) along a line of observation. FIG. 10 shows the situation using five positions of observation. A sub-image is composed of five sub-image segments each taken from a full perspective view as seen from a position $B_i$. In an extreme cases, it is possible to use a only a single pixel column from each complete perspective so that the sub-image width D becomes equal to the number N of perspectives times the pixel pitch. An advantage of generating a composite image indirectly is that it is not necessary to restrict the position of image taking to the projection center when a camera is used. Rather, it is possible to select a distance that is better suited to the available camera optics. In real-time processing this "interlacing" of sub-images and sub-image segments must be carried out by an electronic processing unit (FIG. 6).

Essential for reducing the image repetition rate (and therefore also increasing the light efficiency) in both methods is the relation of the aperture-to-aperture distance within a group, i.e. $S_p$, to the aperture width s. This relationship determines the number of clock cycles in a multiplex cycle and also corresponds to the number of "effective" perspectives. The difference between the perspectives and "effective" perspectives relates to the fact that an aperture opening does no longer permit to view all points of a scene, rather only those that are part of a sub-image. The effective number of perspectives is equal to the number of the different views for any object point shown during a multiplex cycle. The total number of perspectives (or, more precisely of partial perspectives) is by definition always greater than the number of effective perspectives. It is identical with the total number of the apertures and results from the product of the aperture opened simultaneously at a time and the number of effective perspectives.

Although we have explained the multi-aperture technique using the example of stripe-shaped apertures, it is by no means limited to it. Another type of multi-aperture design is to open several circular segments of a shutter as it could be used in a top view geometry.

In the following, we will be giving some design examples that have been constructed according to method I and II. However, they only serve as examples of designs in practical applications. With both methods, two other conditions have to be taken into consideration for a successful design apart from the geometric relations specified above. These are the condition for stereoscopic perception and the condition for suppressing the flipping effect (Reference 7). It is especially the condition for stereoscopic perception that is critical for successful design, and therefore it has been taken into account for the following examples:

a) Method I
Workstation Computer Configuration
    aperture width s=1 cm
    screen width B=39 cm
    number of apertures $N_T$=27
    number of opened apertures $N_o$=3
    distance of screen to shutter plane d=26 cm
    line of observation W=15 cm at a distance of 84 cm b) Method II
Workstation Computer Configuration
    aperture width s=1 cm
    screen width B=30 cm
    number of apertures $N_T$=24
    number of opened apertures $N_o$=6
    distance of screen to shutter plane d=15 cm
    line of observation W=15 cm at a distance of 60 cm c) Method II
Notebook Configuration
    aperture width s=0.5 cm
    screen width B=25 cm
    number of apertures $N_T$=480
    number of opened apertures $N_o$=48
    distance of screen to shutter plane d=3.5 cm
    line of observation W=6.5 cm at a distance of 52.5 camera d) Method II
Television/video Configuration
    aperture width s=0.5 cm
    screen width B=39 cm
    number of apertures $N_T$=72
    number of opened apertures $N_o$=3
    distance of screen to shutter plane d=10 cm
    line of observation W=150 cm at a distance of 120 cm The width W of the line of observation has been specified in the examples above for a minimum distance. The observer (s) may place themselves at a greater distance, whereupon the line of observation would increase (refer to FIG. 7c).

There is a special case that results from the limiting case of method II, where the perspective sub-images D are only one pixel wide. In other words, a micro-aperture arrangement is placed in front of every screen pixel. A micro-aperture is opened synchronously with the perspective view displayed by the screen pixel (FIG. 11). A pixel pitch of 0.5 mm and typical values for the notebook configuration (W=250 mm, L=750 mm) with 12 perspectives, results in a aperture width of s=0.5/12 mm and a apertureperiod of 0.5 mm (the exact values deviate slightly from this). The geometric dimensions are small, but within the limits that can be manufactured today. The advantage of such a configuration for increasing the display brightness will be shown below.

From the examples it can be seen, that many three-dimensional display applications, such as workstations, notebooks or television/video systems can be designed with the methods described here. With method II, it is possible to accommodate very small numbers of perspectives all the way down to the stereoscopic display case. Of course, the zone of observation is rather small with a purely stereoscopic display (+/–one-half eye distance). Such a stereoscopic display can also be combined with a head tracking system. The three-dimensional display system can adapt to a great variety of applications, if the aperturewidth and distance between aperture plane and screen is adjustable.

The essential factor for the functioning of the multi-aperture technique (I or II) is the synchronization of the displayed composite image with the apertures to be opened. FIG. 6 shows the control and processing system. Depending on the image acquisition geometry the processing unit performs geometric corrections and builds up the composite image by perspective interlacing.

The perspective interlacing technique allows to adapt already known techniques which use polarization and color filters glasses to the autostereoscopic technique of this invention. The perspective composites are not displayed in rapid succession on the screen in this adaptation, rather then simultaneously, e.g. by having the image composites of two projectors with orthogonal polarization filters superimposed on a polarization preserving screen or by using a polarization beam combine to superimpose image composites from two (slow) LCD panels or CRT's. In particular it is possible to encode perspectives in different colors that can be simultaneously displayed by practically every standard monitor. A choice of aperturewidth s=1 cm, perspectives sub-images of width D=2 cm and a distance from screen to aperture plane of d=1 cm results in only two aperture groups with two corresponding composite images assigned to them. Instead of time multiplexing the two composites, they are differently polarized or shown with different colors. Hence, the two composite images are simultaneously superimposed on the screen, one of which is seen through the first aperture group and the other through the second aperture group. By combining color and polarization coding it is even possible to display as much as 6 different composite images at the same time. The shutter segments in this design are vertical stripes of polarization and/or color filters. They are completely passive elements and do not require any electronic control and driver mechanism.

Of course, the zone of perception is limited for an observer. But as we already mentioned above, it is possible to determine the position of the by a head tracking system. The displayed composites are changed in accordance with the position of an observer. The control and processing unit would be analogous to FIG. 6. Of course, the shutter control mechanism must be replaced by the head tracking unit in this case. The image processor would up-date the display information according to the tracked position of an observer.

Finally, we would like to describe an enhanced method of our invention for increasing the display brightness based upon the observation that pixel values among different perspectives are strongly correlated for most scenes. The brightness and color of a pixel in neighboring perspectives often change only slightly. This is especially true for pixels that represent object surfaces rather than object edges. Here, the changes between perspectives are very small. The picture brightness I of each and every pixel can be decomposed into a bias component $I_b$ that is common to several perspectives and a modulation component $I_m$ that represents the actual change in every perspective:

$$I = I_B + I_M \qquad \text{equation 7}$$

The bias component does not represent the average value of the perspective intensities, but their minimum value. This results from the fact that light intensities are always positive. Therefore the modulation component can not be subtracted from the bias component, but only be added. Therefore, the greater the number of perspectives, the more probable it is that the bias component is small and the modulation component is large. FIG. 12a shows the assumed intensity profile for a pixel as a function of time (with 6 time cycles corresponding to a number of 6 perspectives). However, only the integrated brightness of an aperture is essential for the brightness perception (assuming that the multiplex process is fast enough). In the standard operation mode, the brightness $S_m(I)$ corresponds to the integrated pixel intensity profile during the the opening of aperture m (FIG. 12b). Let us now assume that the sixth part of the minimum intensity $I_{min}$ in the intensity profile of FIG. 12a became constant, i.e. is let through the shutter for all perspectives (we will describe how that can be practically implemented below). The modulation component is equal to the difference of the original intensity values reduced by the minimum intensity. The sum of both components determine, as expressed in equation 7, the intensity profile as shown in FIG. 12c while FIG. 12d shows the integrated aperture brightness (cross-hatched area). The cross-hatched areas in FIGS. 12b and 12d are identical by design and the same applies to all other apertures so that we achieve exactly the same image brightness as in FIG. 12a with a reduced intensity profile as shown in FIG. 12c (assuming that the bias component is always let through). Or, said differently: for the same intensity range it is possible to increase the aperture brightness with this technique. Since the minimum intensities of pixels in general may have rather low values for a larger number of perspectives (or even go to zero), the "savings" in the intensity profile are not always significant (as the comparison of FIGS. 12a and 12c demonstrates). However, we can also apply the decomposition into bias and modulation component over a smaller number of perspectives instead of the entire range of perspectives. While one group of perspectives is multiplexed, all apertures that do not belong to this group must be opaque. FIG. 13a shows how the intensity profile of FIG. 12a is broken down into two switching groups. The bias component of the first is significantly greater (by a factor 3) than the bias component for all perspectives, so that it is possible to reduce the intensity profile of the pixels more effectively within this group. The intensity profile for the second group (which contains the original minimum intensity) is somewhat larger than before (FIG. 12c). But as we can see from the comparison of FIGS. 12c and 13a, the average intensity profile of FIG. 13a is significantly lower than in FIG. 12a. In fact, one can systematically construct a decomposition into switching groups, so that the average intensity profile is minimized. We consider a number of N perspectives with minimum intensity $I_{min}$ and splitting it up into $N_1$ and $N_2$ perspectives with minimum intensities $I_{min}=I_{min}$ (the original minimum intensity shall be within the $N_1$ perspectives) and $I_{min2}$. The average intensity profile for this decomposition is smaller than for the original perspectives if the following applies:

$$I_{min} < \frac{N_2 - 1}{N_2} \cdot I_{min2} \qquad \text{equation 8}$$

This criterion can be applied successively. Based upon N perspectives one determines first the decomposition into perspectives $N_1$ and $N_2$ that result in a minimal average intensity. This can be done in N comparisons using equation 8. Then, one can repeat the procedure for the perspective numbers $N_1$ and $N_2$ found in this fashion until there is no longer a decomposition that results in a lower average intensity. If a decomposition results in an average intensity profile that is exactly the same as with the previous number of perspectives, the maximum of the intensity profile can be minimized in addition. This is the case for the profile in FIG. 13c that shows the same average intensity as in FIG. 13a, but it has a lower maximum intensity (of course, minimizing the maximum intensity may also be used as a general criterion for the decomposition into switching groups). In general, the optimal decomposition breakdown will be specific for each screen pixel. That is why this technique is most effective when it can be optimized for every screen pixel independently. This is exactly the case for the design described above where every screen pixel has its own micro aperture in front of it. For other designs (including the single aperture geometry) the decomposition has to be selected in such a way that an overall improvement for all screen pixel is achieved. Since the decomposition does not depend on the absolute intensity profile, rather than on the correlation of perspectives from pixel to pixel, it is always possible to achieve a reduction in the average intensity. In the simplest case, it is possible to choose a fixed division into groups of three or four perspectives since there is always a correlation of almost all screen pixel for such a small number of perspectives. In the worst case, i.e. if no correlation is found that can be used for an increase in brightness, then it is possible to use the standard operation mode, i.e. with $I_B=0$.

FIG. 16 shows the system for generating the bias component images and the modulation component images. The neighboring perspectives views are stored in an image memory and the intensities of each screen pixel with the same x-y coordinates are evaluated by an arithmetic processor in according to the technique of the invention. This is done for every pixel in the image. The minimum value of intensity found is divided by the number of apertures in the corresponding switching group and stored as the bias component of this switching group. The modulation component is equal to the difference of the original intensity and the minimum value.

The functional principle described above requires three different aperture states:

transparent to the bias component, but opaque to the modulation component transparent to the bias and modulation component opaque to the bias and modulation component Therefore, it is necessary to have an additional degree of freedom for distinguishing the bias and modulation component, since a simple aperture cannot differentiate between these two components. Polarization of light offers suitable optical channels for encoding this information and is anyway used implicitly by the electro-optical shutters that work with polarization filters. Furthermore, polarization is a property of light that is orthogonal to color so that the color display capability is not compromised. FIG. 14 shows a schematic diagram of the technical implementation. Here, the bias component is encoded with horizontal polarization while the modulation component is encoded with vertical polarization (it is only important that the polarization states are orthogonal). The bias component is also encoded with vertical polarization during the time cycle where the modulation component is transmitted.

The electro-optical shutter consists of two electro-optical modulators, which we will designate with the abbreviation of EOM in the following (for instance, two ferro-electrical liquid crystal), behind each of which a polarize is placed. We assume that the polarizes are transparent for vertical polarization and opaque for horizontal polarization. The input polarization is rotated by 90 degree when polarized light is passes through the electro-optical medium with an electrical voltage applied. The following switching states can be implemented:

1. There is no voltage on either electro-optical modulator. Therefore, vertical polarization (the modulation component) passes through the first EOM while the bias component with its horizontal polarization is blocked. Just as with the first EOM, the vertical polarization passes unobstructed through the second EOM and the subsequent polarizes. By definition the bias component is always required and must be encoded in the modulation component during this state, i.e. it is also transmitted in vertical polarization.

2. a voltage is applied to the first EOM, but not to the second. The first EOM rotates the horizontal polarization into vertical polarization while the vertical polarization is rotated into the horizontal polarization state. Since the polarizers only allow vertical polarization to pass, the bias component is let through, but not the modulation component that now appears in horizontal polarization. As previously, the second EOM does nor have any influence on the vertical polarization.

3. a voltage is applied to the second EOM, by which the vertical input polarization is rotated into horizontal polarization and then stopped at the output polarizer. Since only vertical polarization is transmitted through the vertical polarizer of the first EOM, this element is opaque to all light (regardless of the original polarization).

FIG. 13c shows the polarization state of the bias and modulation component for the intensity profile of the first switching group. FIG. 13d shows the polarization of the light let through by the aperture m=3. Therefore, the device described, which is in principle a combination of two electro-optical shutters, has the required property to control three transmission states.

Such a device has another positive property: with liquid crystals used as electro-optical shutters, available contrast ranges from 100:1 to 150:1. That is not always sufficient for the ideal three-dimensional image display, especially for systems that are designed for a large number of perspectives. Due to perspectives which are shining through closed shutters that should ideally be completely opaque a visible halo effect can occur. Using two shutters in close contact is a simple, but effective method of increasing the contrast. It is known from optics that the contrasts of two transmission plates multiply when they are combined. Then an overall contrast of 10,000:1 can be achieved with two single shutters having a contrast of 100:1 each. Therefore, a very high contrast is achieved by switching two apertures in both shutters synchronously. However, there is another perturbation effect. Since the two shutters have a finite thickness and a finite, albeit small distance from each other some light incident on the first aperture opening (see FIG. 15a) is blocked off by the neighboring segments of the second aperture placed behind the first. Since the apertures are scanned over the entire shutter surface, one observes striping across the display. Therefore, the visual impression is as if one would observe the three-dimensional scene through a lattice fence. However, by switching the neighboring apertures of the second aperture also transparent, an unobstructed light path (FIG. 15b) is formed which effectively suppresses the lattice fence effect. The total contrast is only insignificantly reduced, because it is only locally reduced around one aperture opening. The method described may be used in the same way for the multi-aperture and the single-aperture technique.

There are a variety of possibilities that are described in the literature for generating polarized light. It is both possible to use polarization filters in front of a screen and to combine polarized components of two light sources. If projection devices are used in the display, polarization filters may be used in front of their optic and the polarized images are superimposed on a suitable screen that preserves polarization. If CRTs or flat displays are used, the bias and modulation components can be superimposed with a polarization combiner. Using polarized light implies a 50% loss in the light performance in respect to non-polarized light sources. However, this loss is unavoidable in any case if an electro-optical shutter aperture is used for the shutter.

An alternative to the polarization technique is to use only one screen and to display the bias and modulation components one after the other. In this process, the double EOM's are controlled in such a fashion that all of the apertures of a switching group are opened for the bias component while only the appropriate single apertures are opened for the modulation component.

What is claimed is:

1. Technique for auto-stereoscopic image-acquisition, generation and display by means of a screen and an optical shutter placed in front of this screen, whereby the shutter is composed of segments that can be switched from an optical transparent to an opaque state and vice versa, thus forming aperture segments through which an observer positioned within a certain distance and angular field in front of the device, views a composite of several perspectives of a scene, which have to be properly acquired or generated, as they are presented on the screen, and which is characterized by the use of a control and processing unit in order to display on the screen image composites formed from extracted partial perspective views, which are arranged adjacent and non-overlapping according to specification, whereby each partial extract of a perspective is identical to the one that would be perceived from real objects when viewed from a corresponding projection center in front of the optical shutter through a group of open aperture segments, and where a projection center is the geometric location in front of an aperture segment from which a partial extract of a perspective is determined as the set of all intersection points on the screen with lines that run from the projection point to any surface point of the viewed, virtual objects, and where the aperture segments limit the field of view on the objects, so that only partial views of a perspectives are obtained, and by the synchronous opening of the aperture segments while displaying the image composite, which is made up of the partial perspective extracts corresponding to the opened aperture segments, and by a display frame rate for the image composites that is determined by the product of the number of aperture groups and the frame rate which is in general required for a flicker free display.

2. Technique according to claim 1, characterized by projection centers that are horizontally centered with the aperture segments of a corresponding aperture group and with a center-to-center distance between successive apertures equal to the width of a partial extract from a perspective.

3. Technique according to claim 2, characterized by a distance L between the observation zone and the aperture plane and a distance $\Delta$ from the start of the observation zone to a line of observation of pre-specified width W, which are determined by the distance d from the shutter plane to the screen, the width D of a partial perspective view, the number of aperture segments $N_T$, their segment width s and the width W of the line of observation according to:

$$L = \frac{d \cdot N_T \cdot s}{D - s}$$

$$\Delta = \frac{W \cdot d}{D - s}.$$

4. Technique according to claim 1 characterized by a ratio of the projection center-to-center distances to the aperture-to-aperture distance of a group of open shutter segments, so that the back projected partial perspective views towards an observation line placed in front of and parallel to the shutter and display screen, overlap completely.

5. Technique according to claim 4 characterized by the distance $S_p$ from an open aperture segment to the next and their segment widths s, which are determined by the distance L of an observation line, of width W, to the shutter plane, the distance d of the shutter to the plane of the screen, and the width D of the partial perspective views according to:

$$S_p = \frac{D \cdot L}{L + d}$$

$$s = \frac{D \cdot L - W \cdot d}{L + d}.$$

6. Technique according to claim 1, characterized by the fact that each partial perspective view of an image composite is decomposed into a plurality of segments, whereby each segment corresponds to a different observer position along a line of observation which is parallel to the display and the optical shutter plane and in a freely chosen distance to the projection center which corresponds to the extracted partial perspective.

7. Technique according to claim 1 where an imaging device in Scheimpflug condition, i.e. with the image recording plane inclined in respect to the optical axis, is used for the acquisition of perspectives from real scenes or, in case the perspectives are generated from digital data sets, where the generated projection coordinates are equivalent to ones obtained under Scheimpflug condition.

8. Technique according to claim 1, characterized by a partial perspective view that is represented by only one pixel and where each pixel is assigned to a number of shutter segments, equal to the number of perspective views to be displayed, and where the change of pixel brightness and color with the perspective view is in synchronism with the opening of the corresponding shutter segment.

9. Technique according to claim 1 characterized by a decomposition of the brightness of every screen pixel in a bias and a modulation component, whereby the bias component is transmitted through all apertures within a group of brightness correlated perspectives or image composites, while the modulation component is multiplexed and superimposed to the bias component.

10. Technique according to claim 9 characterized by the decomposition of every pixel in a bias component $I_B$ and a modulation component $I_M$, whereby this decomposition is done by groups and with $I_B$ being equal to the Nth fraction of the minimum value $I_{min}$ for a group of N perspectives. Starting with N perspectives a decomposition in two groups of $N_1$ and $N_2$ perspectives is constructed, with minimum intensities $I_{min1}=I_{min}$ and $I_{min2}$ respectively, whereby the required average intensity for the two groups to achieve the same brightness as with the initial N perspectives is smaller, if and only if, the following equation holds:

$$I_{min} < \frac{N_2 - 1}{N_2} \cdot I_{min2}$$

this criterion is successively applied, i.e. first on the initial N perspectives then for the derived decomposition of $N_1$ and $N_2$ perspectives which yield a smaller average intensity and so on, until no decomposition into groups can be found that results in a smaller required average intensity to achieve the same brightness.

11. Techniques according to claim 9 characterized by the use of two orthogonal polarization states for encoding of the bias and modulation component, and further, the use of an optical shutter that consists of two electro-optical modulators each followed by a polarization filter, such that application of a voltage to any of the two electro-optical modulators results in the rotation of the input polarization state by 90 degree, so that by voltage control of the first electro-optical modulator the shutter becomes transparent to either the bias or the modulation component and by controlling the voltage to the second electro-optical modulator the shutter can be rendered opaque to all light.

12. Techniques according to claim 1, where an electro-optical shutter is used that consists of two individual electro-optical shutters that are aligned to each other, and where synchronously with the opening of an aperture of the first shutter the corresponding opposite aperture plus a number of neighboring apertures of the second shutter are also opened.

13. Techniques according to claim 1, where a number of image composite is encoded in orthogonal polarization and/or color states which are simultaneously superimposed on the screen, and where this superposition is viewed through a corresponding array of polarization and/or color filters, whereby each filter blocks all polarization or color components of an image which do not match the polarization and/or color state of the filter.

14. Technique according to claim 13 characterized by the use of vertical stripes of polarization or color filters, which act completely passive and without any electronic control.

* * * * *